(12) United States Patent
Abad et al.

(10) Patent No.: US 7,878,248 B2
(45) Date of Patent: Feb. 1, 2011

(54) SYSTEM, METHOD, AND APPARATUS FOR POST-FRACTURE TREATMENT

(75) Inventors: Carlos Abad, Richmond, TX (US); Kevin W. England, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 51 days.

(21) Appl. No.: 12/344,890

(22) Filed: Dec. 29, 2008

(65) Prior Publication Data
US 2010/0163225 A1  Jul. 1, 2010

(51) Int. Cl.
*E21B 43/26* (2006.01)
*E21B 47/06* (2006.01)

(52) U.S. Cl. ............... 166/300; 166/250.07; 166/308.2; 166/308.5

(58) Field of Classification Search .................. None
See application file for complete search history.

(56) References Cited

U.S. PATENT DOCUMENTS

| | | | |
|---|---|---|---|
| 2,596,137 A * | 5/1952 | Fast ........................... | 166/282 |
| 3,381,523 A * | 5/1968 | Nettles .................... | 73/40.5 R |
| 3,858,658 A * | 1/1975 | Strubhar et al. .......... | 166/308.1 |
| 4,665,982 A | 5/1987 | Brown | |
| 4,964,466 A | 10/1990 | Williams et al. | |
| 5,224,546 A | 7/1993 | Smith et al. | |
| 6,763,888 B1 | 7/2004 | Harris et al. | |
| 7,036,597 B2 * | 5/2006 | O'Brien et al. .......... | 166/308.2 |
| 7,228,904 B2 | 6/2007 | Todd et al. | |
| 7,735,551 B2 * | 6/2010 | Vozniak et al. ........... | 166/177.5 |
| 2007/0000666 A1 * | 1/2007 | Vozniak et al. ........... | 166/308.1 |

FOREIGN PATENT DOCUMENTS

WO      2007140157 A1    12/2007

* cited by examiner

*Primary Examiner*—George Suchfield
(74) *Attorney, Agent, or Firm*—Martin Rzaniak; David Cate; Robin Nava (57) ABSTRACT

A method includes hydraulically fracturing a subterranean formation with a first treatment fluid and allowing the hydraulic fracture to close. The method includes preparing a second treatment fluid having a damage removal agent including carbon dioxide. The second treatment fluid further includes a proppant pack damage removal agent including an oxidizer, a radical initiator, an acid, a solvent, and/or other damage removal agents. The method further includes injecting the second treatment fluid into the subterranean formation at a downhole pressure below a fracturing pressure for the subterranean formation. The method includes holding pressure on the formation while the second treatment fluid enhances formation and proppant pack permeability, and flowing the second treatment fluid back to the surface.

11 Claims, 5 Drawing Sheets

SYSTEM, METHOD, AND APPARATUS FOR POST-FRACTURE TREATMENT

FIELD OF THE INVENTION

The present invention relates to damage clean-up in hydraulically fractured wells.

BACKGROUND

Hydraulic fracture treatments are utilized extensively in the oilfield and other applications to improve well productivity and infectivity. Hydraulic fracture treatments often involve the placement of particles, or proppant, which hold a developed fracture open after a fracture treatment is complete. Fluids which have the characteristics to develop the fracture geometry and to deliver the proppant typically have viscosity generated by polymers or additives to the fluid. Accordingly, there is a demand for further improvements in this area of technology.

SUMMARY

One embodiment is a unique method for enhancing the permeability of a hydraulic fracture. Other embodiments include unique systems and methods to cleanup damage in a fracture and formation face. Further embodiments, forms, objects, features, advantages, aspects, and benefits shall become apparent from the following description and drawings.

DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, and any alterations and further modifications in the illustrated embodiments, and any further applications of the principles of the invention as illustrated therein as would normally occur to one skilled in the art to which the invention relates are contemplated and protected.

Figure 1:
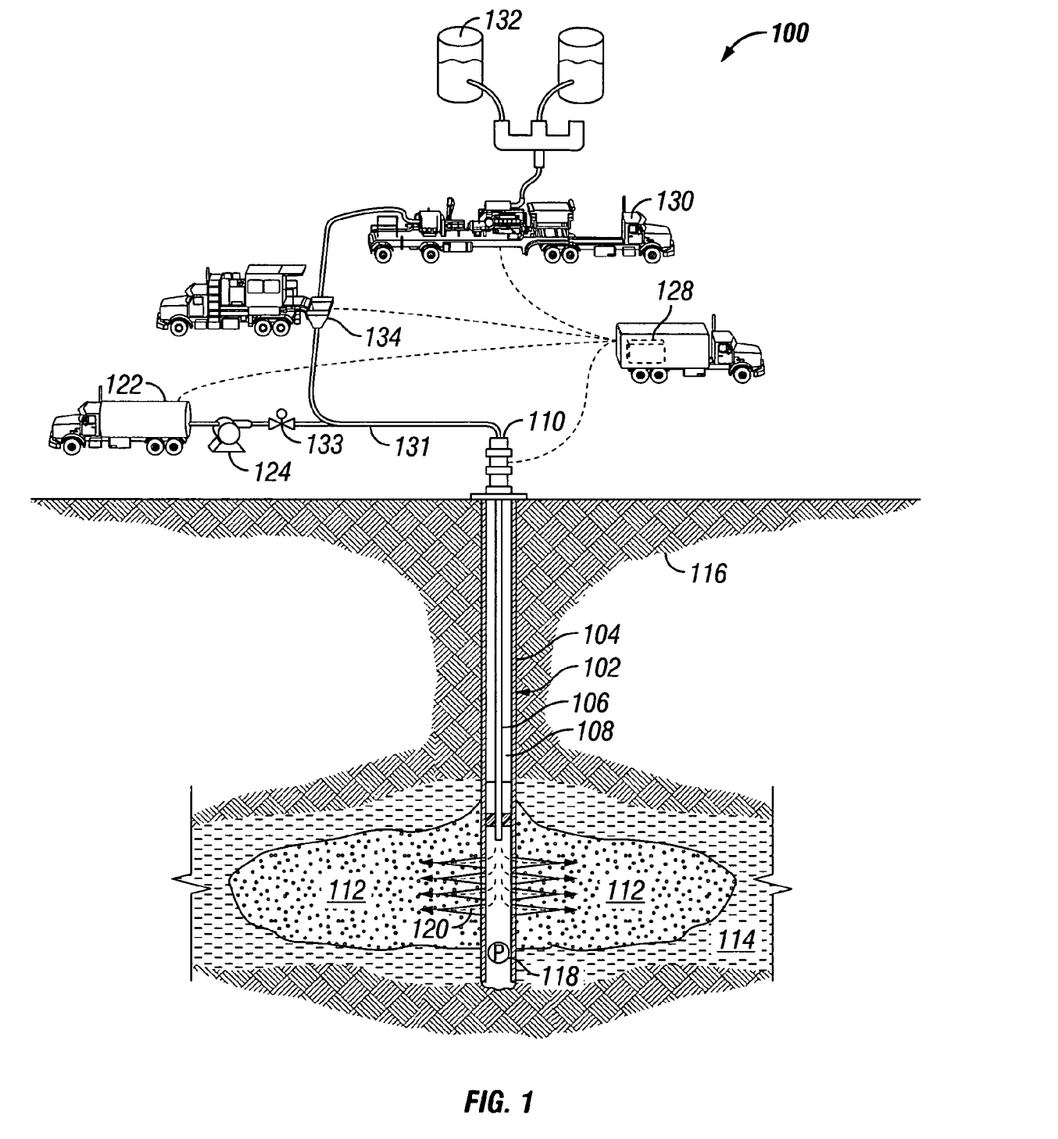
FIG. 1 is a schematic diagram of a system for enhancing the permeability of a hydraulic fracture.

FIG. 1 is a schematic diagram of a system 100 for enhancing the permeability of a hydraulic fracture. The system 100 includes a wellbore 102 intersecting a subterranean formation of interest 114 (hereinafter "formation of interest 114"), with a hydraulic fracture 112 disposed in the formation of interest 114. The wellbore 102 is illustrated as a vertical well, but may be of any geometry including at least deviated or horizontal. The wellbore 102 is illustrated as a completion with casing 104, but may be any completion type including at least cased, open-hole, and screened with or without a gravel pack. The formation of interest 114 may be a hydrocarbon bearing formation, such as an oil or gas formation, but any type of formation is contemplated herein including at least water wells, disposal wells, and injection wells. An overburden 116 may be present in the system 100 representing any formations above the formation of interest 114. The system 100 may include multiple hydraulic fractures and/or multiple formations of interest, however a single fracture 112 and formation of interest 114 is illustrated to simplify explanation of the concepts herein.

The system 100 includes a treatment fluid 120 having carbon dioxide 122. In a further embodiment, the treatment fluid 120 includes a brine 132. The treatment fluid 120 does not carry proppant, may be delivered at lower pumping rates than would be utilized in a hydraulic fracture treatment, and it may be desirable for the treatment fluid 120 to have a final downhole viscosity that is relatively low to avoid shifting of proppant in the hydraulic fracture. Therefore, in some embodiments, the treatment fluid 120 does not include any significant amount of polymeric constituent or viscoelastic surfactant. However, where the hydraulic fracture 112 is long, some viscosification of the treatment fluid 120 may be desirable to avoiding fingering of the treatment fluid 120 and assist in distributing the treatment fluid 120 throughout the hydraulic fracture 112. Further, where friction losses in the delivery path may be unusually high (e.g. in a small diameter coiled tubing) it may be desirable to include a polymer or viscoelastic surfactant to reduce friction losses or assist in treatment fluid 120 distribution with a relatively lower injection rate. The included polymer or viscoelastic surfactant may be lower than would be utilized in a hydraulic fracture treatment for a wellbore 102 of similar depth and temperature. The inclusion of polymer or viscoelastic surfactant, and the amounts thereof, are a mechanical step for one of skill in the art based upon the specific attributes of a given embodiment of the system 100 and the disclosures herein.

The treatment fluid 120 is illustrated as being injected into the subterranean formation of interest 104 as an example, but any fluid meeting the description of a treatment fluid 120 is contemplated herein. As non-limiting examples, the treatment fluid 120 may exist at the surface, it may be injected into the formation, it may be shut in to the formation, and/or the treatment fluid 120 may be flowed back out of the wellbore 102 to the surface.

The system 100 includes a pump 130 that injects the treatment fluid into the formation of interest 114 in response to the injection rate signal delivered from a controller 128. The injection rate signal from the controller 128 may be a signal provided by a computer or a signal provided by an operator (not shown). In the illustration of FIG. 1, the system 100 includes a second pump 124 that adds the carbon dioxide 122 to a treatment line 131 prior to injection in the wellbore 102. Any combination of a pump 130, pumps 124, 130, or multiple pumps to achieve desired injection rates are contemplated herein.

The system 100 includes the pump(s) 124, 130 fluidly coupled to a coiled tubing unit (not shown), a tubing 106 disposed in the wellbore 102, a casing 104 disposed in the wellbore 102, and/or a casing-tubing annulus 108. The illustration of FIG. 1 depicts a delivery path through the tubing 108 to a perforated region in the casing 104 connecting the wellbore 102 to the hydraulic fracture 112. Any delivery path known in the art that allows delivery of the treatment fluid 120 to the hydraulic fracture 112 is contemplated herein.

The system 100 further includes, in certain embodiments, a blender 134 structured to mix damage removal agent(s) in the treatment fluid 120. The blender 134 may add damage removal agents including an oxidizer, a radical initiator, an inorganic peroxide, an enzyme, a redox couple, a reducing agent, an acid, a latent acid, an ester, a mineral oil, a natural oil, a surfactant, a solvent, a decrosslinker, a complexing agent, and/or a chelating agent to the treatment fluid 120. In some embodiments, additives and/or damage removal agents may be added partially or completely without the blender 134, for example by pre-mixing one or more additives into fluid tanks 132.

The selected damage removal agent(s) depend upon the type of damage expected in the hydraulic fracture 112 and the degree of damage removal required for the system 100. For example, where a greater amount of damage removal is indicated the number of damage removal agent types and concentrations of the damage removal agents may be increased. Non-limiting examples of situations where a greater amount of damage removal may be indicated include a high permeability formation of interest 114, a low conductivity hydraulic fracture 112, a deep and/or hot wellbore 102 where a very large polymer concentration was utilized in the fracturing treatment that placed the hydraulic fracture 112, an exceptionally long hydraulic fracture 112, large wellbore 102 spacing wherein each well is expected to drain a large geographical area of the reservoir, exceptionally high injection costs for a wellbore 102 that will be used for injection or disposal, and exceptionally high prices for produced fluids from the wellbore 102.

The selection of specific damage removal agents depend upon the type of damage to be removed and the degree of damage removal required. The initial fluid utilized to generate the hydraulic fracture 112 may be of any type including at least guar-based fluids, xanthan, diutan, any other polysaccharides, polyacrylamide and/or other synthetic polymers, synthetic polymer fibres, resins, olygomers, tackifiers, viscoelastic surfactants and/or other surfactant based structures, acid fluids (e.g. those containing HCl, HF, HCOOH, polylactic acid, hydroxyl acetic acid, EDTA, etc.), and any of these fluids crosslinked or emulsified by any method. In one example, where a metal-crosslinked hydraulic fracturing fluid was utilized to generate the hydraulic fracture, an enzyme breaker, complexing agent, and/or chelating agent may be indicated as a damage removal agent. In another example, where wettability damage is incurred by the fracturing fluid, a surfactant as a damage removal agent may be indicated.

An acid and/or a latent acid may be indicated as a damage removal agent where a pH change is expected to decrosslink the fluid in the hydraulic fracture 112, and/or where the resulting acid will assist in dissolving remaining material (e.g. polymer remainder, particles utilized in the fracturing fluid, fluid loss agents utilized during the fracture treatment, or in other situations where an acid is expected to assist in removing damage from the hydraulic fracture 112 or the formation face exposed to the hydraulic fracture 112. A latent acid includes any substance that is acidic, or more acidic, at downhole conditions than at surface conditions. Latent acids include, without limitation, acid salts, acid pre-cursors, acid complexes, encapsulated acids, coated acids, and/or materials that react under conditions present downhole to create an acid such as esters and the like.

Other non-limiting examples of damage removal agent indications include: solvents and/or surfactants utilized to assist in initiating fluid flow; radical initiators, enzymes, inorganic peroxides, and/or decrosslinkers to assist in breaking and thinning the remaining fracture fluid in the hydraulic fracture 112. The examples provided are non-limiting, and any damage removal agent may be utilized depending upon the specific circumstances in a particular embodiment of the system 100.

The system 100 includes a controller having modules structured to functionally execute procedures for enhancing a permeability of the hydraulic fracture. The description herein including modules emphasizes the structural independence of the aspects of the controller 128, and illustrates one grouping of operations and responsibilities of the controller 128. Other groupings that execute similar overall operations are understood within the scope of the present application. Modules may be implemented in hardware and/or software on computer readable medium, and modules may be distributed across various hardware or software components. In certain embodiments, the controller 128 forms a portion of a processing subsystem that includes one or more computing devices having memory, processing, and communication hardware. The controller 128 may be a single device or a distributed device, and the functions of the controller may be performed by hardware, software, and/or at least partially performed by an operator (not shown).

The controller includes a pressure measurement module structured to interpret a downhole pressure, and a pressure control module structured to provide an injection rate signal in response to the downhole pressure such that the downhole pressure does not exceed a fracture pressure of the formation of interest 114. In a further embodiment, the pressure control module is further structured to provide the injection rate signal such that the carbon dioxide 122 is injected into the hydraulic fracture 112 as a supercritical fluid. In one embodiment, the system 100 includes a downhole pressure sensor 118, wherein the pressure measurement module is further structured to receive a pressure signal from the downhole pressure sensor 118. In some embodiments, the downhole pressure is provided by an observed pressure (e.g. from a pressure measured on an open tubing-casing annulus 108) and/or determined according to calculations based on an observed surface pressure and/or other pressure, with hydraulic and friction calculations as understood in the art. More specific descriptions of certain embodiments of controller 114 operations are included in the section referencing FIG. 2.

Figure 2:
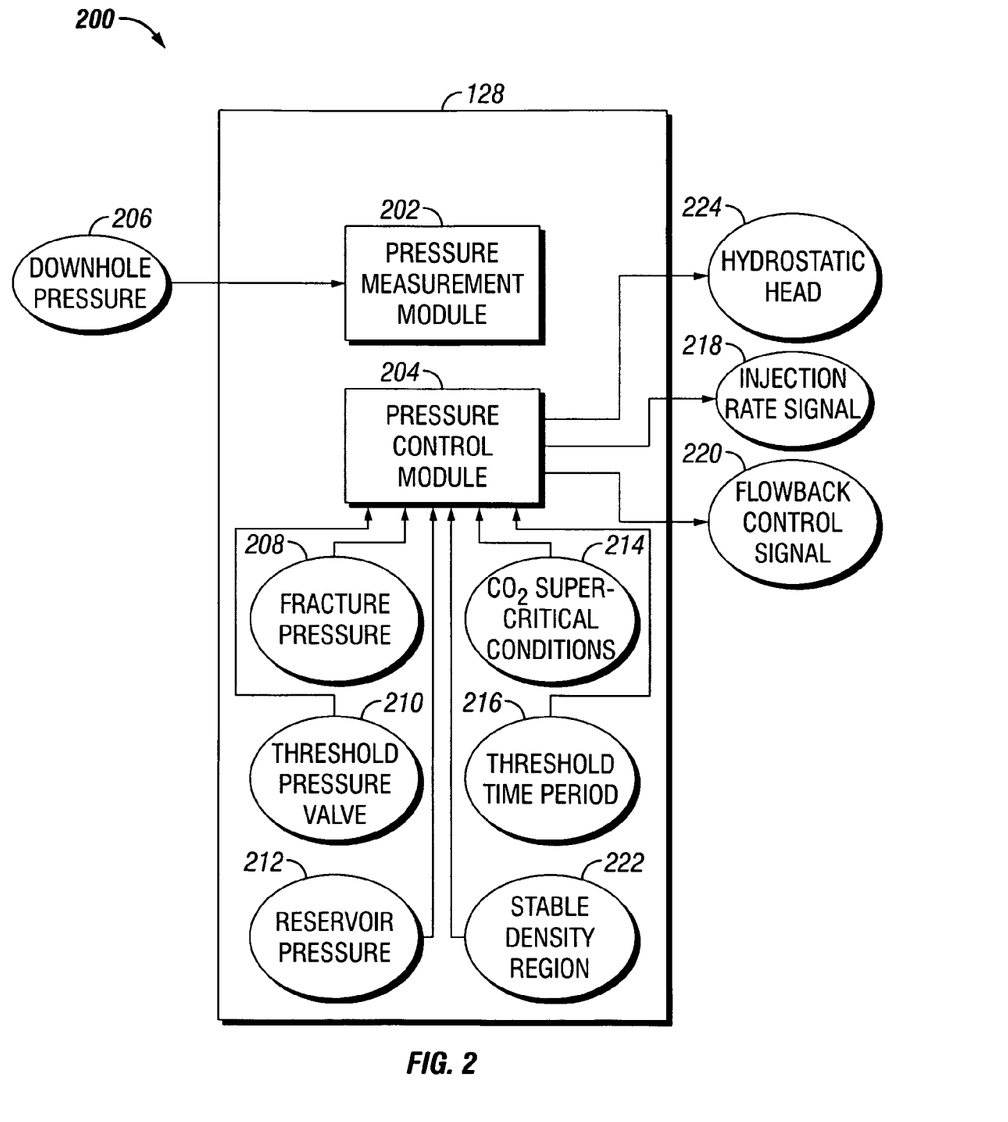
FIG. 2. is a schematic diagram of a controller structured to perform operations to enhance the permeability of a hydraulic fracture.

FIG. 2. is a schematic diagram 200 of a controller 128 structured to perform operations to enhance the permeability of a hydraulic fracture 112. The controller 128 includes a pressure measurement module 202 structured to interpret a downhole pressure 206. Interpreting a downhole pressure 206 includes receiving or determining a downhole pressure 206 through any means understood in the art. In one embodiment, the system includes a downhole pressure sensor 118, and the pressure measurement module 202 receives a pressure signal from the downhole pressure sensor 118 as the down hole pressure 206.

The controller 128 further includes a pressure control module structured to provide an injection rate signal 218 in response to the downhole pressure 206 such that the downhole pressure 206 does not exceed a fracture pressure 208 of the formation of interest 114. The fracture pressure 208 may be a value entered by an operator (not shown), and/or stored on the controller 128 according to an estimated or previously determined value. In one embodiment, the pressure control module 204 operates as software stored on a computer readable medium. In one embodiment, the pressure control module 204 comprises an operator (not shown) observing a pressure readout of the downhole pressure 206 and manually controlling a pump rate to keep the downhole pressure 206 below the fracture pressure 208.

In a further embodiment, the pressure control module 204 is further structured to provide the injection rate signal 218 such that the carbon dioxide 122 is injected into the hydraulic fracture 112 as a supercritical fluid. The controller 128 may have a set of carbon dioxide supercritical conditions 214 stored or input from a user, which may include a target window of pressures and temperatures wherein the carbon dioxide 122 will be present at a supercritical condition. In one example, the carbon dioxide 122 may be utilized as a solvent for the hydraulic fracture treatment fluid and/or for formation fluid, and the downhole pressure 206 may be controlled to within the supercritical region of carbon dioxide (or to within a subset of the region) to enhance the solubility of the dissolved fluid into the carbon dioxide.

In certain embodiments, the pressure control module 204 controls the downhole pressure 206 utilizing a pump rate, and in certain embodiments, the pressure control module 204 controls the downhole pressure 206 by manipulating a hydrostatic head 224 of fluid in the wellbore 102. For example, the pressure control module 204 can manipulate the hydrostatic head 224 by selecting different density fluids from separate tanks 132, and/or by adjusting a percentage of carbon dioxide 122 in the treatment fluid 120.

In certain embodiments, the pressure control module 204 manipulates the hydrostatic head 224 of fluid in the wellbore by manipulating the density of the supercritical fluid, but this method requires precise measurement of the downhole pressure 118 and can be unstable due to large density fluctuations in the supercritical fluid in response to moderate pressure changes. In one embodiment, the pressure control module 204 holds the downhole pressure 206 above a stable density region 222 for the carbon dioxide 120. The stable density region 222 varies according to the precision of the available downhole pressure 206 measurement, the presence of pressure measurements at intermediate depths (not shown), the available quality of fluid and pressure models, the available computing power in the controller 128, the temperature of the formation of interest 114, and the present temperature in the hydraulic fracture 112 during treatment which may vary in time. In one embodiment, the stable density region is above about 100 bar absolute pressure.

Figure 3:
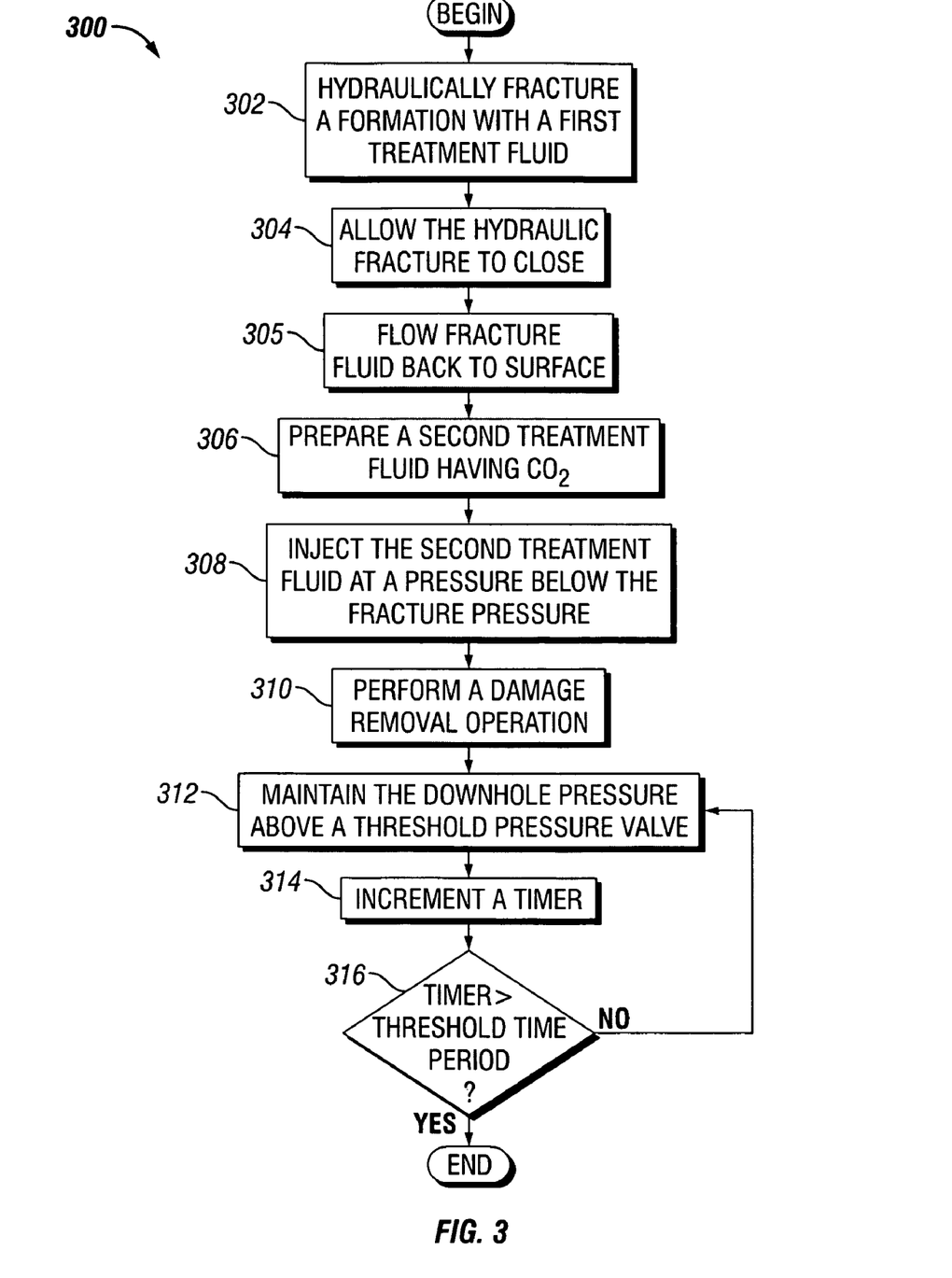
FIG. 3 is a schematic flow diagram of a procedure to enhance the permeability of a hydraulic fracture.
Figure 4:
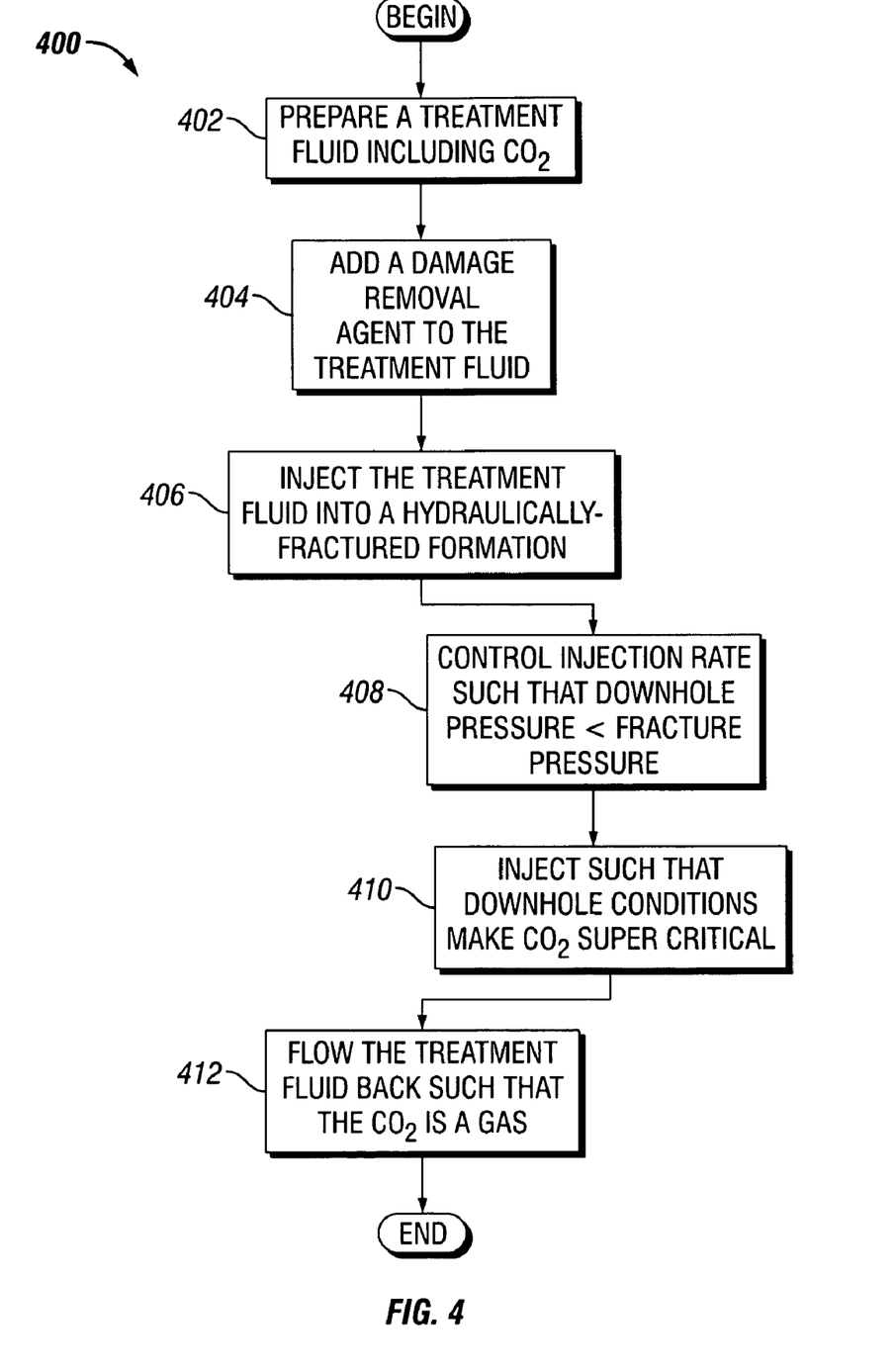
FIG. 4 is a schematic flow diagram of an alternate procedure to enhance the permeability of a hydraulic fracture.
Figure 5:
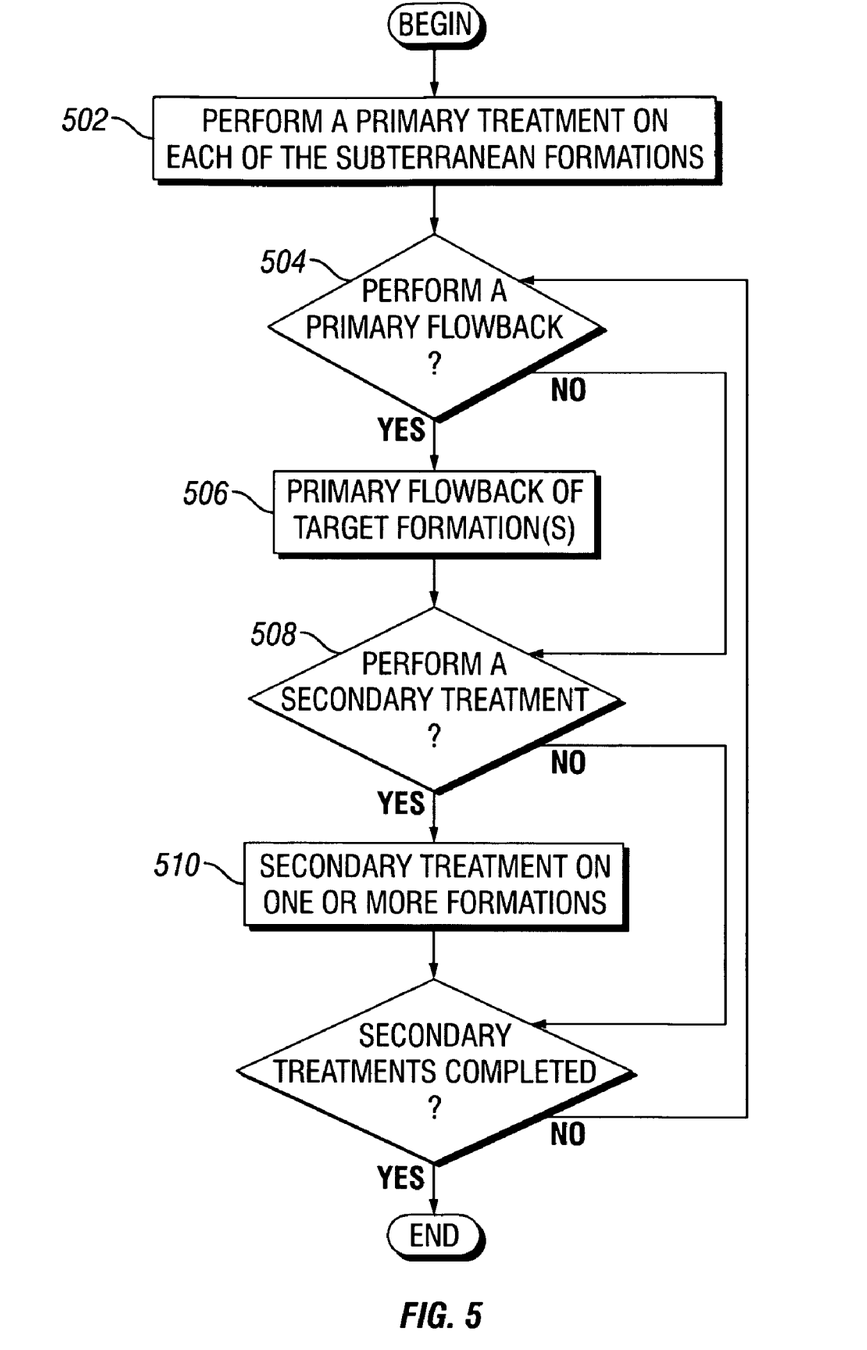
FIG. 5 is a schematic flow diagram of an alternate procedure to enhance the permeability of a plurality of hydraulic fractures.

The schematic flow diagrams in FIGS. 3 through 5, and the related descriptions which follow, provide illustrative embodiments of performing operations for enhancing the permeability of a hydraulic fracture and formation face. Operations illustrated are understood to be exemplary only, and operations may be combined or divided, and added or removed, as well as re-ordered in whole or part, unless stated explicitly to the contrary herein.

FIG. 3 is a schematic flow diagram of a procedure 300 to enhance the permeability of a hydraulic fracture. The procedure 300 includes an operation 302 to hydraulically fracturing a subterranean formation with a first treatment fluid, and an operation 304 to allow the hydraulic fracture to close. The procedure 300 may further include an operation 305 to allow the fracture to unload and flow fluid out of the wellbore. In certain embodiments, the first treatment fluid is polymeric fracturing fluid. The procedure 300 further includes an operation 306 to prepare a second treatment fluid having carbon dioxide, and an operation 308 to inject the second treatment fluid into the subterranean formation at a downhole pressure below a fracturing pressure for the subterranean formation. In certain embodiments, the second treatment fluid does not include a polymeric constituent and/or any viscoelastic constituent.

In a further embodiment, the procedure 300 includes an operation 310 to perform a damage removal operation 310. The illustrated procedure 300 further includes an operation 312 to maintain the downhole pressure above a threshold pressure value, an operation 314 to increment a timer and a further operation 316 to check whether the timer has exceeded a threshold time period. In response to the timer not exceeding the threshold time period, the procedure 300 includes the operation 312 to continue maintaining the downhole pressure above the threshold pressure value. The procedure thereby results in maintaining the downhole pressure above the threshold value for a threshold time period. The threshold time period is selected according to the damage removal operation—for example the time expected for the second treatment fluid to diffuse into the formation face of the hydraulic fracture, the time expected for damage removing chemical reactions to occur at the temperatures in the formation. The threshold time period may further be selected according to operational or logistical considerations. The operation 312 to maintain the downhole pressure includes any pressure maintenance activity understood in the art, including at least shutting in the wellhead or continuing to pump the second treatment fluid—potentially at a reduced injection rate from a primary injection rate.

In the illustration of FIG. 3, the operation 310 to perform the damage removal operation may continue during some or all of the operations 312, 314, 316 to maintain the downhole pressure above the threshold value. In some embodiments, the operation 310 to perform the damage removal operation continues through a flowback operation (not shown) where the second treatment fluid is brought back to the surface.

Examples of damage removal activities performed during the operation 310 include: acid hydrolyzing a constituent of the first treatment fluid, decrosslinking a crosslinked constituent of the first treatment fluid, chelating a metal crosslinker constituent of the first treatment fluid, dissolving at least one water insoluble constituent of the first treatment fluid, breaking a viscoelastic surfactant portion of the first treatment fluid, and/or breaking a filtercake in the hydraulic fracture. In certain embodiments, the operation 310 includes penetrating the formation face of the subterranean formation with carbon dioxide and unloading material from the first treatment fluid that was trapped in the formation face, combining the carbon dioxide in an oil phase thereby reducing a viscosity of the oil phase, adsorbing the carbon dioxide onto a surface of the subterranean formation thereby releasing adsorbed hydrocarbon gas, and/or distributing a breaker chemical throughout the hydraulic fracture. In certain embodiments, the operation 310 includes distributing a damage removal agent throughout the hydraulic fracture, where the damage removal agent includes an oxidizer, a radical initiator, an inorganic peroxide, an enzyme, a redox couple, a reducing agent, an acid, a latent acid, an ester, a mineral oil, a natural oil, a surfactant, a solvent, a decrosslinker, a complexing agent, and/or a chelating agent.

FIG. 4 is a schematic flow diagram of an alternate procedure 400 to enhance the permeability of a hydraulic fracture. The procedure 400 includes an operation 402 to prepare a treatment fluid having carbon dioxide. The procedure 400 further includes an operation 404 to add a damage removal agent to the treatment fluid. The damage removal agent includes an oxidizer, a radical initiator, an inorganic peroxide, an enzyme, a redox couple, a reducing agent, an acid, a latent acid, an ester, a mineral oil, a natural oil, a surfactant, a solvent, a decrosslinker, a complexing agent, and/or a chelating agent. The procedure 400 further includes an operation 406 to inject the treatment fluid into a subterranean formation having a hydraulically induced fracture, an operation 408 to control the injection rate such that the downhole pressure is below a fracture pressure for the formation, and an operation 410 to inject the treatment fluid under conditions such that carbon dioxide is present as a supercritical fluid. The procedure 400 further includes an operation 412 to flow the treatment fluid to surface under conditions such that carbon dioxide is present as a gas.

FIG. 5 is a schematic flow diagram of an alternate procedure 500 to enhance the permeability of a plurality of hydraulic fractures. The procedure 500 includes an operation 502 to perform a primary treatment on each of a plurality of subterranean formations, where the subterranean formations intersect a wellbore. The primary treatment is the injection of a first treatment fluid that creates a hydraulically induced fracture in each subterranean formation. The procedure 500 further includes an operation 504 to determine whether a primary flowback of one or more target formations is to be performed. The target formation(s) include one or more of the subterranean formations, and may include higher priority and/or sensitive zones where primary flowback before a secondary treatment is desirable. Primary flowback for a subterranean formation includes unloading the hydraulic fracture in the formation and flowing a portion of the primary treatment fluid out of the wellbore to a surface location.

The procedure 500 includes an operation 506 to perform a primary flowback of the target formation(s) in response to determining that a primary flowback is to be performed (operation 504 with a YES determination). The procedure 500 includes an operation 508 to perform a secondary treatment on one or more of the subterranean formations. The secondary treatment includes preparing a treatment fluid including carbon dioxide, injecting the treatment fluid into the subterranean formation, and controlling a pump rate of the injecting such that a downhole pressure at the subterranean formation depth is below a fracturing pressure for the subterranean formation. The procedure 500 further includes an operation 510 to perform a secondary treatment on one or more of the subterranean formations in response to determining that secondary treatment is to be performed (operation 508 with a YES determination). The operation 510 may be performed on each subterranean formation individually, and may be performed on more than one subterranean formation simultaneously.

The procedure 500 includes an operation 512 to determine whether all secondary treatments are completed. The procedure 500 end in response to determining all secondary treatments are completed (operation 512 with a YES determination), and returns to a previous point in the procedure 500 in response to determining all secondary treatments are not completed (operation 512 with a NO determination). The illustration of FIG. 5 shows the procedure 500 returning to the operation 504, but the procedure 500 may return to any other location in the procedure 500, including at least the operation 502 to perform a primary treatment on another of the subterranean formations.

It will be clear from the illustration of the procedure 500 that primary treatments, primary flowback, and secondary treatments may be performed on multiple subterranean formations intersecting a wellbore in any order and in any grouping. Examples of operations for the procedure 500 are described herein, but are not intended to limit the ordering or treatment options for treating multiple hydraulic fractures within a single wellbore. The operations of primary treatment, primary flowback, and secondary treatment may be performed for any or all of a plurality of hydraulic fractures intersecting a wellbore, and in any order including simultaneously, provided only that for a given hydraulic fracture, the primary treatment occurs before the secondary treatment, and closure of the hydraulic fracture (but not necessarily the primary flowback) occurs before injection operations of the secondary treatment.

In one example, a plurality of hydraulic fractures intersecting the wellbore receive secondary treatment consecutively before any of the hydraulic fractures are subjected to the primary flowback. In a second example, a plurality of hydraulic fractures intersecting the wellbore receive secondary treatment before all of the fractures are subjected to primary flowback, but some of the hydraulic fractures are allowed a primary flowback before all of the hydraulic fractures receive secondary treatment. In the second example, without limitation, a hydraulic fracture in a higher priority zone and/or a more sensitive zone may be allowed a primary flowback before all of the zones receive secondary treatment while lower priority zones may be shut in until all zones receive secondary treatment.

In a third example, each of a plurality of hydraulic fractures intersecting the wellbore receive primary treatment and primary flowback, and then each hydraulic fracture receives secondary treatment consecutively. In a fourth example, a plurality of hydraulic fractures receive a primary treatment, and the hydraulic fractures receive a simultaneous secondary treatment (e.g. the second treatment fluid is injected into multiple hydraulic fractures simultaneously) before any of the hydraulic fractures receive a primary flowback. In a fifth example, a plurality of hydraulic fractures receive a primary treatment, one or more of the hydraulic fractures receive a primary flowback (e.g. higher priority and/or sensitive zones), and the hydraulic fractures receive a simultaneous secondary treatment before remaining hydraulic fractures receive a primary flowback. In a sixth example, a plurality of hydraulic fractures receive a primary treatment, each of the hydraulic fractures receives a primary flowback, and the hydraulic fractures receive a simultaneous secondary treatment.

As is evident from the figures and text presented above, a variety of embodiments according to the present invention are contemplated.

One exemplary embodiment is a method including hydraulically fracturing a subterranean formation with a first treatment fluid and allowing the hydraulic fracture to close, where the first treatment fluid may be a polymeric fracturing fluid. The method may further include allowing the hydraulic fracture to unload and flow fluid out of the wellbore. The method further includes preparing a second treatment fluid including carbon dioxide, and injecting the second treatment fluid into the subterranean formation at a downhole pressure below a fracturing pressure for the subterranean formation. The method further includes maintaining the downhole pressure above a threshold pressure value for a threshold time period, where the threshold pressure value is a pressure value greater than or equal to a reservoir pressure for the subterranean formation, and below the fracturing pressure for the subterranean formation. The method further includes performing a damage removal operation including acid hydrolyzing a constituent of the first treatment fluid, decrosslinking a crosslinked constituent of the first treatment fluid, chelating a metal crosslinker constituent of the first treatment fluid, dissolving at least one water insoluble constituent of the first treatment fluid, breaking a viscoelastic surfactant portion of the first treatment fluid, and/or breaking a filtercake in the hydraulic fracture.

The method further includes penetrating a formation face of the subterranean formation with carbon dioxide and unloading material from the first treatment fluid that was trapped in the formation face, combining the carbon dioxide in an oil phase thereby reducing a viscosity of the oil phase, adsorbing the carbon dioxide onto a surface of the subterranean formation thereby releasing adsorbed hydrocarbon gas, and/or distributing a breaker chemical throughout the hydraulic fracture. In some embodiments, the second treatment fluid does not have a polymeric constituent. The method includes distributing a second treatment fluid constituent throughout the hydraulic fracture, where the second treatment fluid constituent includes an oxidizer, a radical initiator, an inorganic peroxide, an enzyme, a redox couple, a reducing agent, an acid, a latent acid, an ester, a mineral oil, a natural oil, a surfactant, a solvent, a decrosslinker, a complexing agent, and/or a chelating agent.

Another exemplary embodiment is a system including a wellbore intersecting a subterranean formation of interest, with a hydraulic fracture disposed in the subterranean formation of interest. The system includes a treatment fluid having carbon dioxide. The system includes a controller having modules structured to functionally execute procedures for enhancing a permeability of the hydraulic fracture. The controller includes a pressure measurement module structured to interpret a downhole pressure, and a pressure control module that provides an injection rate signal in response to the downhole pressure such that the downhole pressure does not exceed a fracture pressure of the subterranean formation of interest. In a further embodiment, the pressure control module further manipulates the injection rate signal, and/or manipulates a hydrostatic head of fluid in the wellbore such that the carbon dioxide is injected into the hydraulic fracture as a supercritical fluid. In a still further embodiment, the pressure control module further controls the downhole pressure to a value above a stable density region for the supercritical fluid. In some embodiments, the system includes a downhole pressure sensor, wherein the pressure measurement module is further structured to receive a pressure signal from the downhole pressure sensor.

The system includes a pump that injects the treatment fluid into the subterranean formation in response to the injection rate signal. In a further embodiment, the treatment fluid includes a brine. The system includes the pump fluidly coupled to a coiled tubing unit, a tubing disposed in the wellbore, a casing disposed in the wellbore, and/or a casing-tubing annulus.

Yet another exemplary embodiment is a method including preparing a treatment fluid having carbon dioxide, injecting the treatment fluid into a subterranean formation having a hydraulically induced fracture, and controlling a pump rate of the injecting such that a downhole pressure at the subterranean formation depth is below a fracturing pressure for the subterranean formation. The method includes injecting the treatment fluid under conditions such that carbon dioxide is present as a supercritical fluid. The method further includes flowing the treatment fluid to surface under conditions such that carbon dioxide is present as a gas.

In a further embodiment, the treatment fluid does not include any polymeric component and/or any viscoelastic surfactant component. The method includes adding a proppant pack damage removal agent to the treatment fluid. In certain embodiments, the proppant pack damage removal agent includes an oxidizer, a radical initiator, an inorganic peroxide, an enzyme, a redox couple, a reducing agent, an acid, a latent acid, an ester, a mineral oil, a natural oil, a surfactant, a solvent, a decrosslinker, a complexing agent, and/or a chelating agent.

Another exemplary embodiment is a method including performing a primary treatment to create a hydraulically induced fracture in each of a plurality of subterranean formations intersecting a wellbore, allowing the hydraulically induced fracture in each of the plurality of subterranean formations to close, and performing a secondary treatment on each of the plurality of subterranean formations. Each secondary treatment includes preparing a treatment fluid comprising carbon dioxide, injecting the treatment fluid into the subterranean formation, and controlling a pump rate of the injecting such that a downhole pressure at the subterranean formation depth is below a fracturing pressure for the subterranean formation.

In a further embodiment, the method includes performing a primary flowback on target formation(s) before the performing the secondary treatment the target formation(s), where the target formation(s) are one or more of the subterranean formations, an where the primary flowback includes flowing at least a portion of a fluid injected in the primary treatment from the wellbore to a surface location. The method may include performing the secondary treatment on more than one of the subterranean formations simultaneously.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
    hydraulically fracturing a subterranean formation with a first treatment fluid;
    allowing the hydraulic fracture to close;
    allowing the hydraulic fracture to unload and flow fluid out of the wellbore;
    preparing a second treatment fluid comprising carbon dioxide; and
    injecting the second treatment fluid into the subterranean formation at a downhole pressure below a fracturing pressure for the subterranean formation.

2. The method of claim 1, further comprising after the step of injecting the second treatment fluid, maintaining the downhole pressure above a threshold pressure value for a threshold time period.

3. The method of claim 2, wherein the threshold pressure value comprises a pressure value at least equal to a reservoir pressure for the subterranean formation and below the fracturing pressure for the subterranean formation.

4. The method of claim 1, wherein the first treatment fluid comprises a polymeric fracturing fluid.

5. The method of claim 1, further comprising performing at least one damage removal operation selected from the group consisting of:

acid hydrolyzing a constituent of the first treatment fluid;

decrosslinking a crosslinked constituent of the first treatment fluid;

chelating a metal crosslinker constituent of the first treatment fluid;

dissolving at least one water insoluble constituent of the first treatment fluid;

breaking a viscoelastic surfactant portion of the first treatment fluid; and breaking a filtercake in the hydraulic fracture.

6. The method of claim 1, further comprising penetrating a formation face of the subterranean formation with the carbon dioxide and unloading material from the first treatment fluid that was trapped in the formation face.

7. The method of claim 1, further comprising combining the carbon dioxide in an oil phase thereby reducing a viscosity of the oil phase.

8. The method of claim 1, further comprising adsorbing the carbon dioxide onto a surface of the subterranean formation thereby releasing adsorbed hydrocarbon gas.

9. The method of claim 1, further comprising after the step of injecting the second treatment fluid, distributing a chemical breaker throughout the hydraulic fracture.

10. The method of claim 1, wherein the second treatment fluid does not include a polymeric constituent.

11. The method of claim 1, further comprising after the step of injecting the second treatment fluid, distributing a damage removal agent throughout the hydraulic fracture, the damage removal agent comprising at least one member selected from the group consisting of an oxidizer, a radical initiator, an inorganic peroxide, an enzyme, a redox couple, a reducing agent, an acid, a latent acid, an ester, a mineral oil, a natural oil, a surfactant, a solvent, a decrosslinker, a complexing agent, and a chelating agent.

* * * * *